Jan. 9, 1934.   M. NYSTROM   1,942,613
PHONOGRAPH
Filed Sept. 27, 1930   8 Sheets-Sheet 1

Inventor.
Martin Nystrom

Jan. 9, 1934.  M. NYSTROM  1,942,613
PHONOGRAPH
Filed Sept. 27, 1930   8 Sheets-Sheet 2
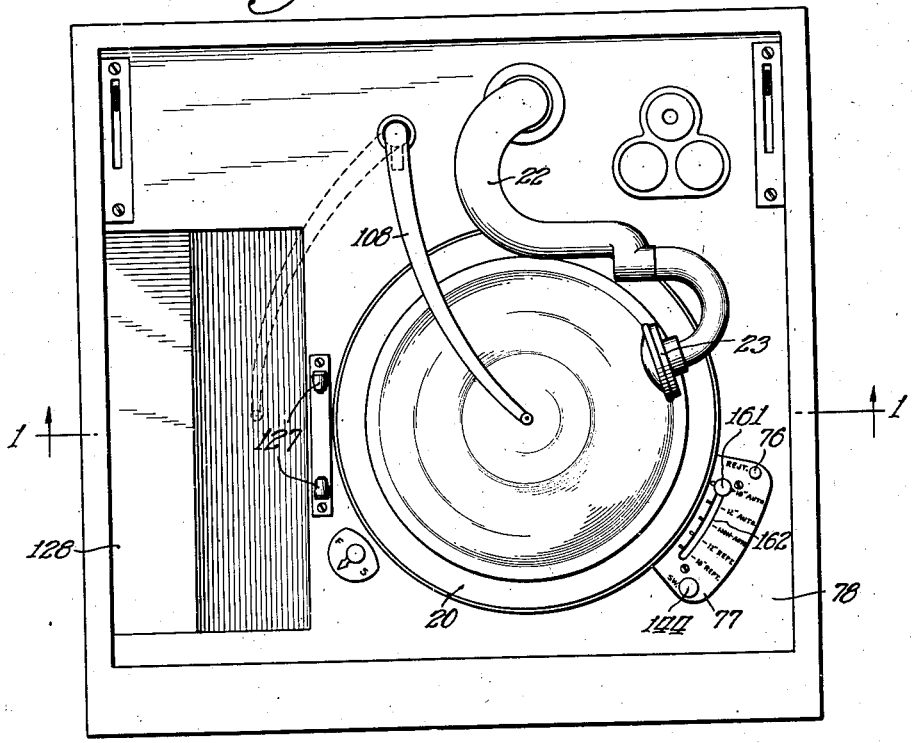
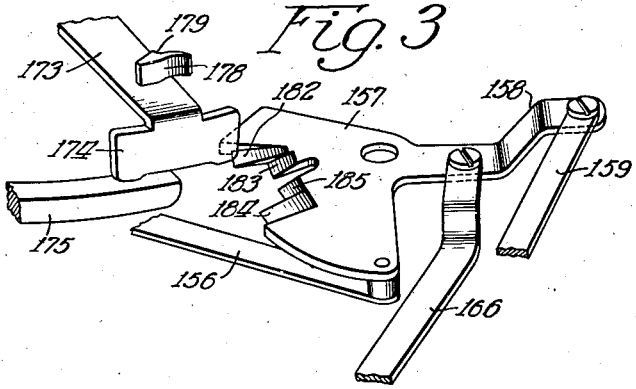
Inventor
Martin Nystrom

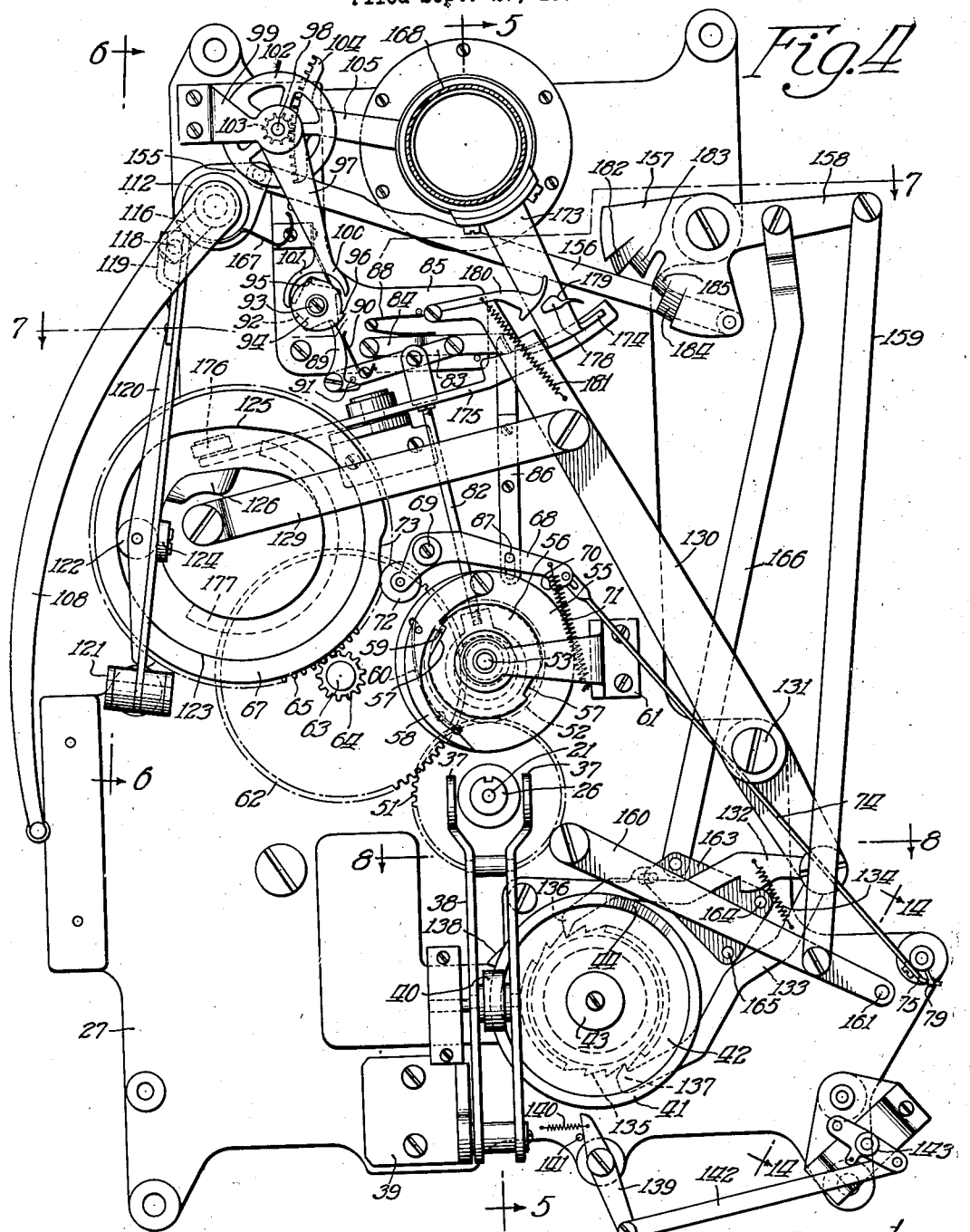

Jan. 9, 1934.  M. NYSTROM  1,942,613
PHONOGRAPH
Filed Sept. 27, 1930   8 Sheets-Sheet 4
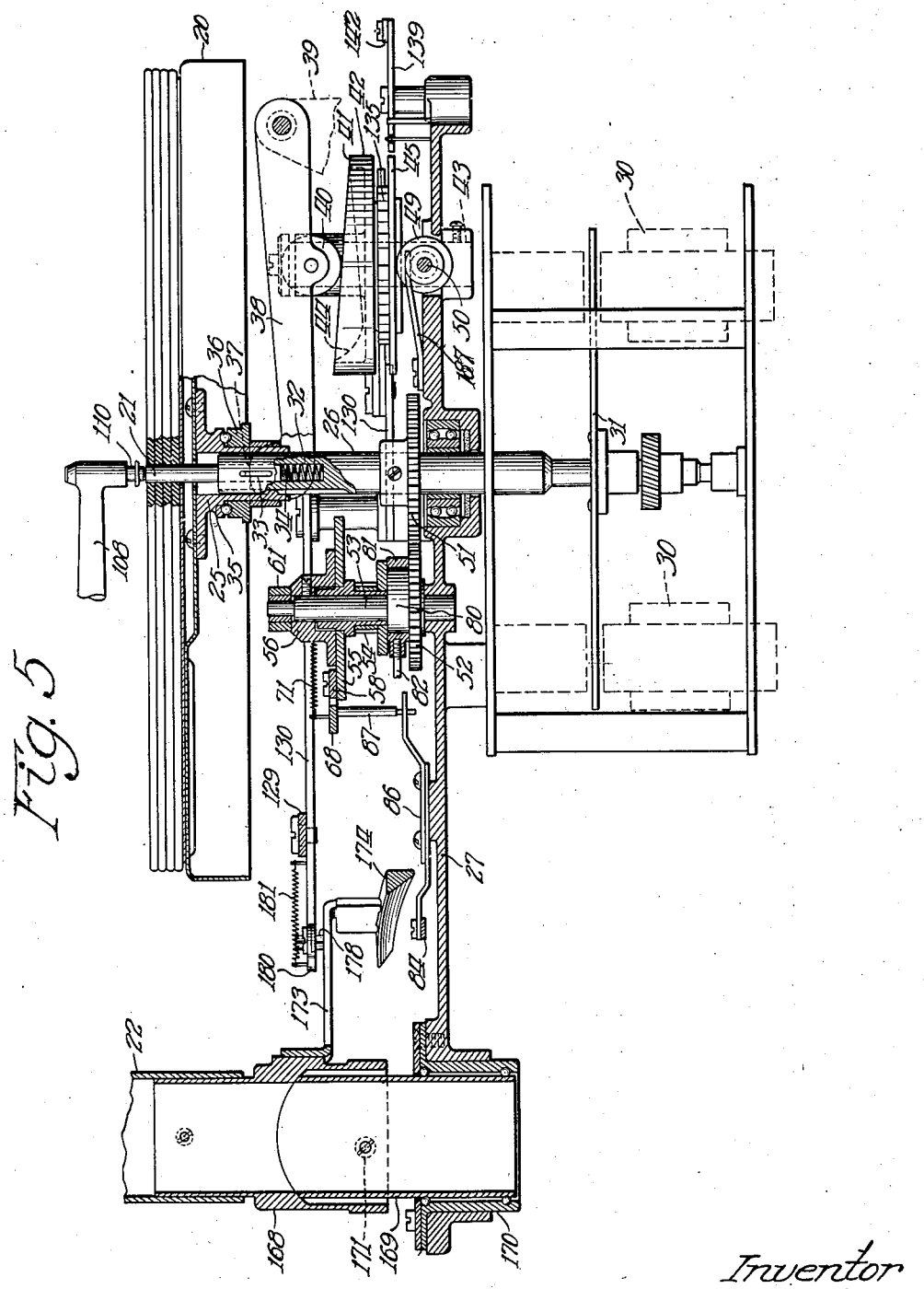
Inventor
Martin Nystrom

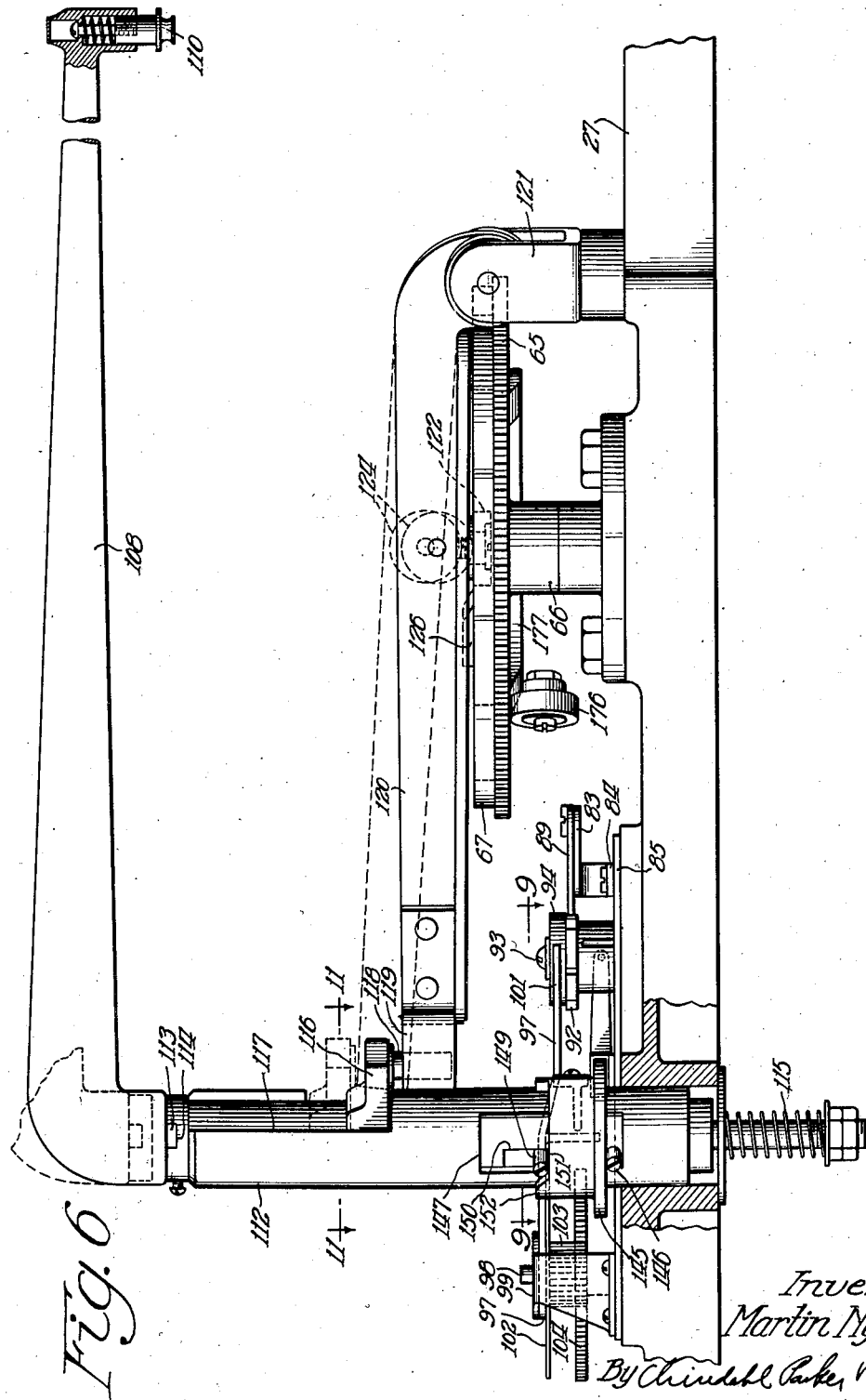

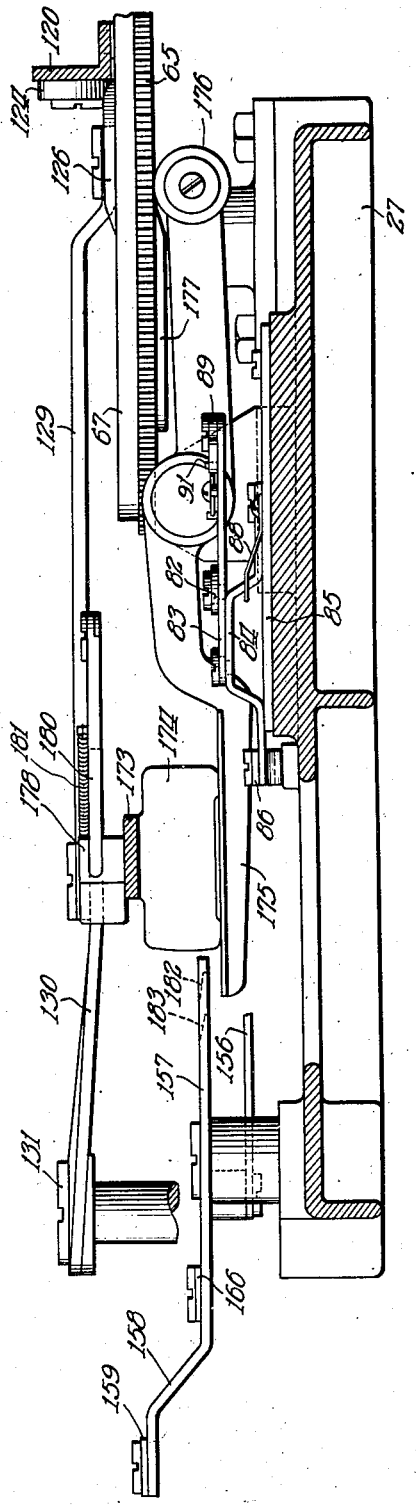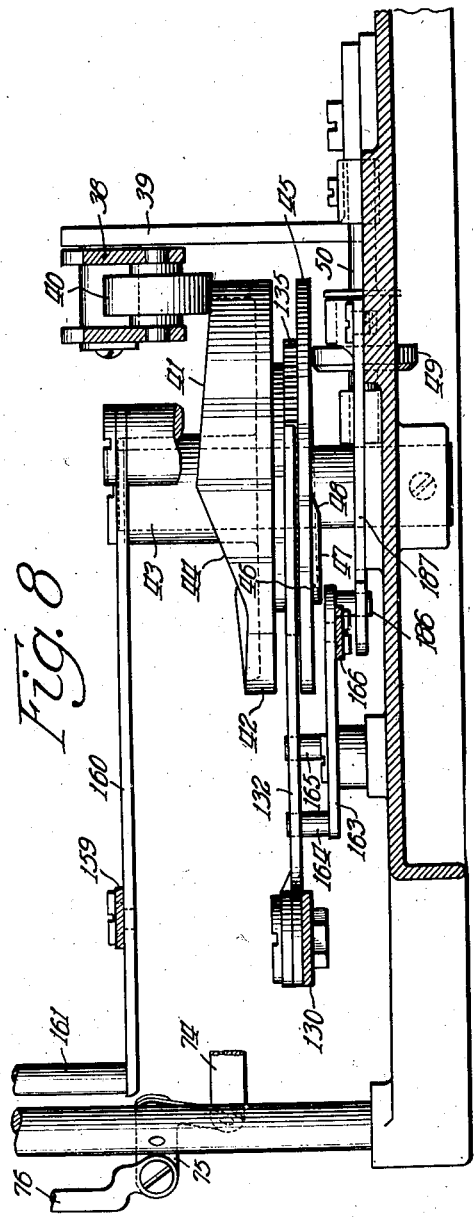

Jan. 9, 1934.  M. NYSTROM  1,942,613
PHONOGRAPH
Filed Sept. 27, 1930    8 Sheets-Sheet 7
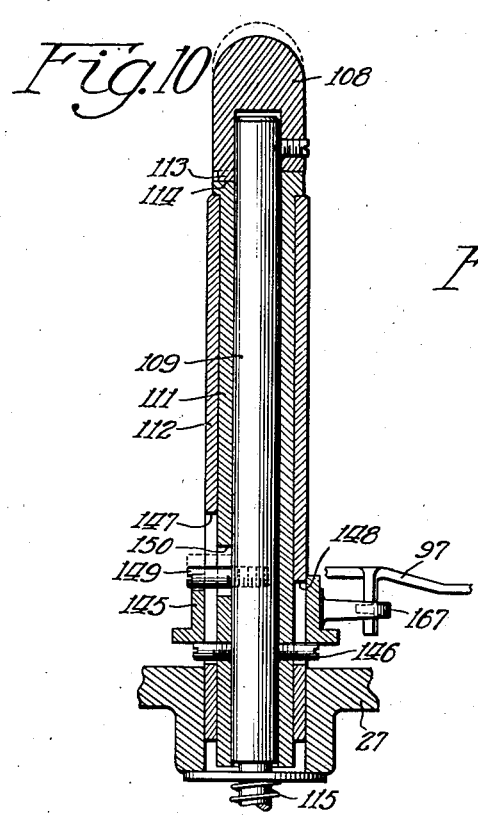
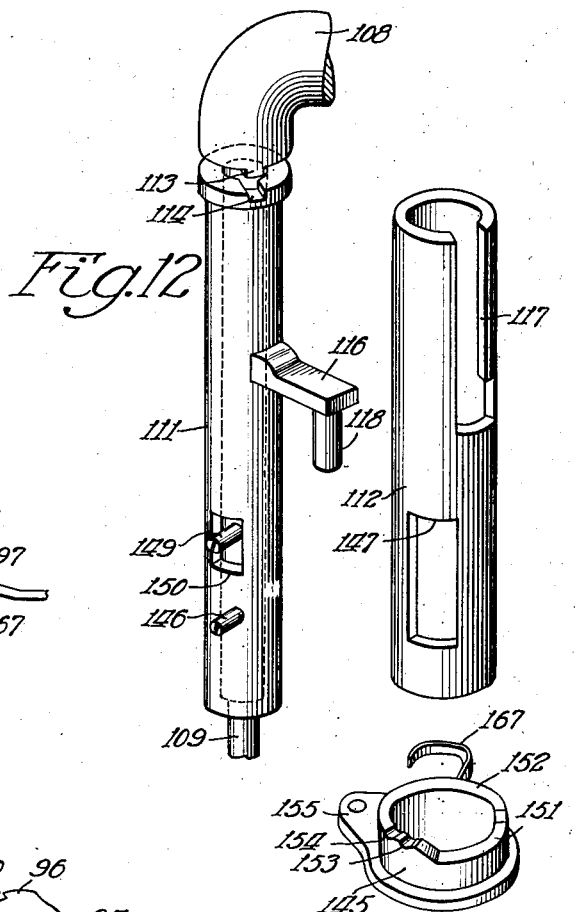
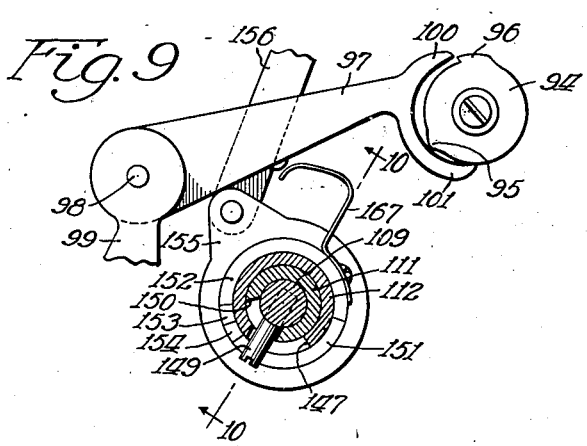
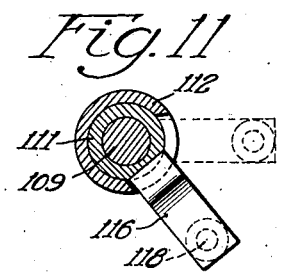
Inventor
Martin Nystrom Jan. 9, 1934.   M. NYSTROM   1,942,613
PHONOGRAPH
Filed Sept. 27, 1930   8 Sheets-Sheet 8
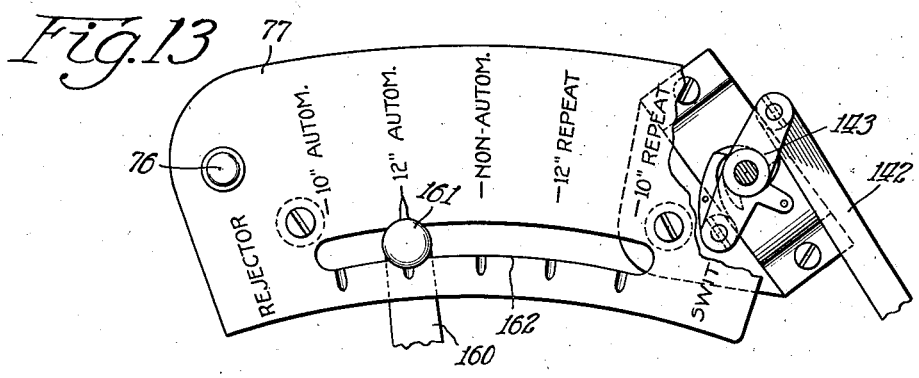
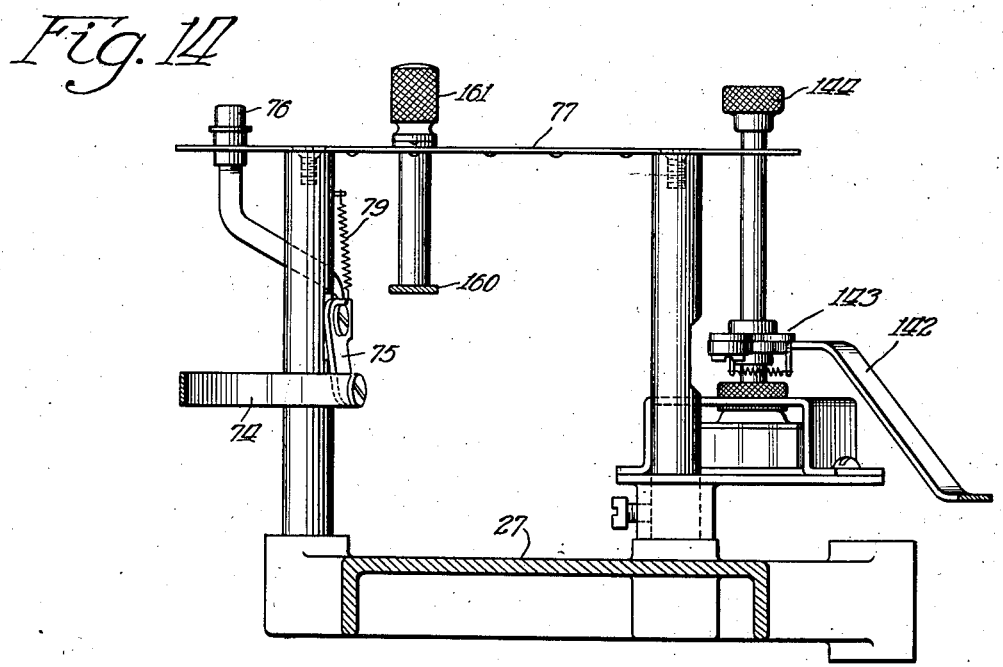
Inventor
Martin Nystrom Patented Jan. 9, 1934

1,942,613

UNITED STATES PATENT OFFICE 1,942,613

PHONOGRAPH

Martin Nystrom, Chicago, Ill., assignor to United Research Corporation, Long Island City, N. Y., a corporation of Delaware Application September 27, 1930
Serial No. 484,765

18 Claims. (Cl. 274—10)

The present invention relates to improvements in phonographs, and more particularly to phonographs capable of automatically playing a plurality of disk records in succession.

A general object of the invention resides in the provision of a novel phonograph which may be rendered automatically operable to play a plurality of records in succession, automatically operable to play a given record repeatedly, or non-automatically operable.

The invention is embodied in a phonograph having a turntable on which a plurality of records are adapted to be stacked. Various objects of the invention reside in the provision of novel means for supporting the turntable and adjusting the latter vertically as the records are removed one by one, and for modifying the vertical movement of the turntable for differently sized records.

Other objects are to provide novel automatic means, the operation of which is adapted to be instituted at will or at the completion of playing the uppermost record, for removing the record from the turntable, and novel means for rendering the automatic record discharge means and the turnable adjusting means inoperable to adapt the phonograph for automatically playing a given record repeatedly.

Further objects reside in the provision of new and improved means for elevating and lowering the tone arm and for swinging the tone arm to return it automatically to initial playing position at will or at the completion of the playing of a record, and novel means for adjusting said first mentioned means and the means for adjusting the turntable to adapt the phonograph for playing differently sized records.

Still another object is to provide a phonograph in which the means for adjusting the turntable, the means for discharging records from the turntable and the means for returning the tone arm to initial playing position are driven from a single power element adapted to be connected automatically and periodically to a source of power through a clutch under the control of a novel non-set mechanism responsive to the movement of the tone arm in playing a record.

Another object is to provide a novel phonograph which is simple, compact and inexpensive in construction, and which is efficient and reliable in operation.

Other objects and advantages will become apparent as the description proceeds.

In the accompanying drawings, Figure 1 is a vertical sectional view taken along line 1—1 of Fig. 2 of a phonograph embodying the features of my invention, the operating mechanism being shown in front elevation.

Fig. 2 is a plan view.

Fig. 3 is a fragmentary perspective view of the means for actuating and guiding the tone arm.

Fig. 4 is a plan view on an enlarged scale of the operating mechanism.

Fig. 5 is a vertical sectional view taken along line 5—5 of Fig. 4.

Fig. 6 is a vertical sectional view taken along line 6—6 of Fig. 4.

Fig. 7 is a fragmentary vertical sectional view taken along line 7—7 of Fig. 4.

Fig. 8 is a fragmentary vertical sectional view taken along line 8—8 of Fig. 4.

Fig. 9 is a fragmentary horizontal sectional view of the clutch control mechanism taken along line 9—9 of Fig. 6.

Fig. 10 is a vertical sectional view taken along line 10—10 of Fig. 9.

Fig. 11 is a transverse sectional view taken along line 11—11 of Fig. 6.

Fig. 12 is a perspective view of the mounting for the record discharging arm, the parts being shown in disassembled relation.

Fig. 13 is a plan view of the control panel.

Fig. 14 is an elevational view of the control panel, taken along line 14—14 of Fig. 4.

Figure 1:
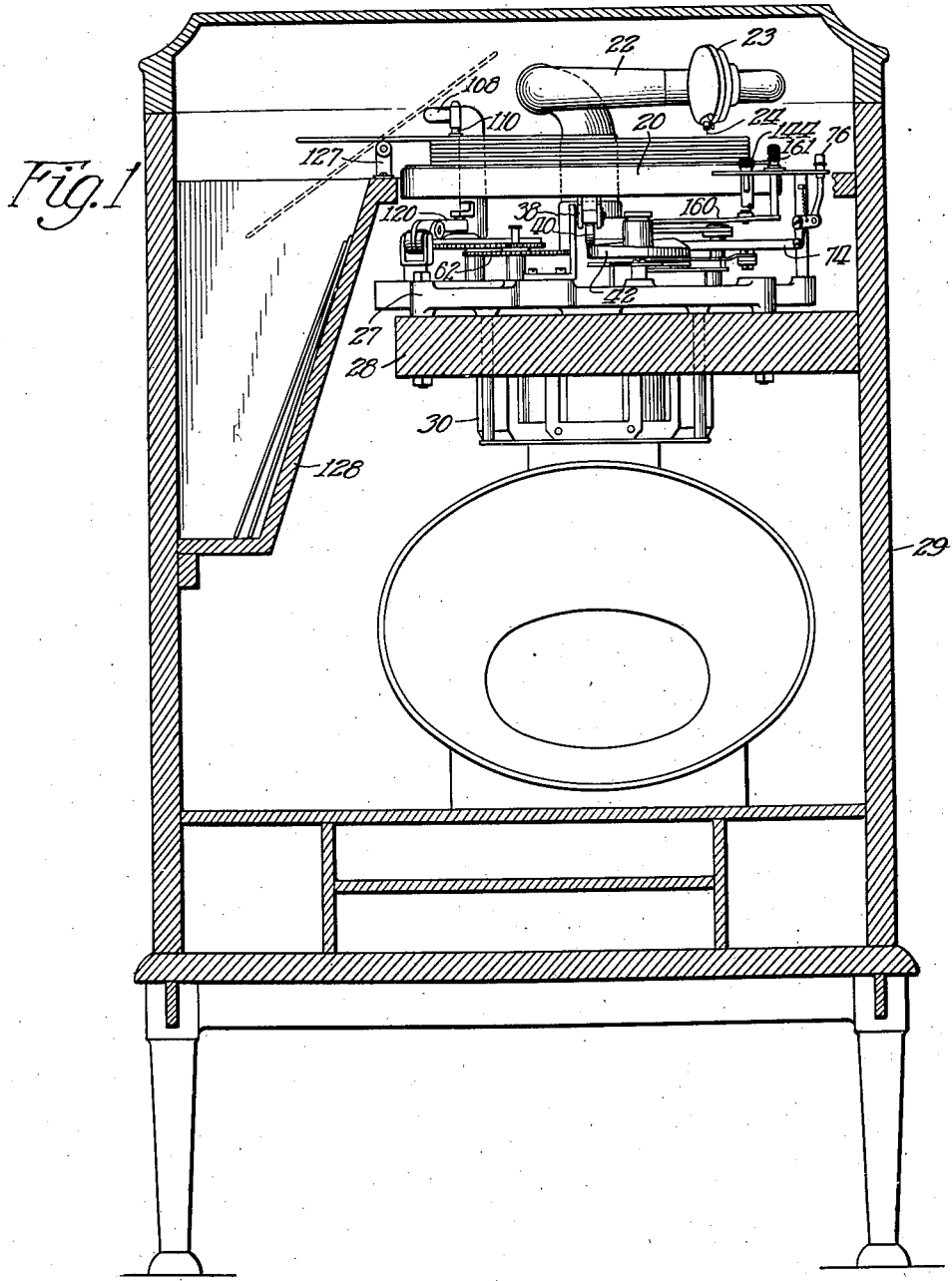

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the phonograph constituting the exemplary embodiment of the invention is of the type in which a plurality of records may be played automatically in sequence. The phonograph also is provided with various adjustments selectively available to adapt the phonograph for playing records of different sizes, to convert the phonograph into the type in which the playing of a given record is automatically repeated, and to render the phonograph non-automatic in operation.

The phonograph in general comprises a suitable horizontal rotatable support or turntable 20 with a vertically adjustable, upstanding axial centering pin 21. The records to be played are stacked on the turntable 20 to the height of the centering pin 21 with the latter in its uppermost position. Mounted for horizontal swinging movement over the turntable 20 is an arm 22 designated for convenience as a tone arm. A sound box 23 carrying a removable stylus 24 is pivotally mounted on the free end of the tone arm 22.

In playing the uppermost record of the stack, the stylus 24 is brought into engagement with the record groove at the starting point adjacent the outer periphery. The tone arm 22 permits the stylus 24 to travel freely along the groove to play the record, and then into an inner groove located at a predetermined distance from the center. Various mechanisms, the operation of which is adapted to be instituted manually at any time or automatically at the completion of the playing of the record, are provided for elevating the stylus 24 out of engagement with the record, discharging the record from the turntable 20, and returning the stylus into initial position to play the next record.

The turntable support and drive

The turntable 20 is provided on its underside with an axial depending sleeve 25 which is slidably keyed for vertical adjustment on the upper end of a vertical drive spindle 26 (see Figs. 4 and 5). The spindle is suitably journaled in a main frame 27 rigidly mounted on a shelf 28 in a suitable cabinet 29 (see Figs. 1 and 3). Any suitable means may be provided for driving the spindle 26, and in the present instance this means comprises an induction motor 30 with a disk rotor 31. The motor coils are mounted on the underside of the frame 27, and the rotor 31 is suitably secured to the lower end of the spindle 26.

The centering pin 21 is slidably mounted in an axial bore 32 in the upper end of the spindle 26, and has a pin and slot connection 33 therewith limiting the extent of its axial movement. A coiled compression spring 34 is disposed within the bore 32, and tends to maintain the centering pin 21 in its uppermost position. In this position, the centering pin 21 projects above the turntable through approximately the thickness of the stack of records to be played.

To support the turntable 20, the sleeve 25 is formed with a downwardly facing annular bearing shoulder 35. An annular collar 36 is rotatably confined on the sleeve 25, and has an end thrust engagement through suitable anti-friction bearings with the shoulder 35. The collar 36 rests on the rounded ends 37 of a forked lever 38 (see Figs. 4, 5 and 8) straddling the sides of the spindle 26, and pivoted at its outer end to a bracket 39 on the frame 27. Journaled in the lever 38 between the forks thereof and intermediate its ends is a roller 40 which rides on the circular face 41 of a cam 42 slidably and rotatably mounted on a stud 43 on the frame 27. The cam face 41 has a gradual spiral contour terminating in an abrupt drop 44 so that upon intermittent counterclockwise rotation of the cam 42 the turntable 20 will be raised as hereinafter described at each removal of one of the records so that the records will be successively presented to the stylus 24 at the same height.

Rigid with and spaced from the underside of the cam 42 is a coaxial cam disk 45 which is formed on its underside and within its peripheral margin with a concentric circular cam 46 having a spiral cam face 47 terminating in an abrupt drop 48. A flanged roller 49 is slidably and rotatably mounted on a fixed rod 50 on the frame 27, and is adapted for axial adjustment radially of the cam disk 45 by means hereinafter described into bearing engagement either with the disk 45 adjacent the outer margin of the latter or with the cam face 47.

The foregoing adjustment of the roller 49 makes it possible to take into account the difference in thickness of two differently sized records, for example ten inch and twelve inch records. For twelve inch records, the roller 49 is adjusted to engage the outer margin of the cam disk 45, thus giving to the cam 42 exclusive control over the vertical adjustment of the turntable 20. However, for ten inch records, the roller 49 is adjusted to engage the cam 46 which raises the cam 42 and modifies its action to compensate for the smaller dimension as to thickness of the ten inch records regardless of the number of records on the turntable 20. It will be evident that the roller 49 acting through the cam 42, the lever 38 and the collar 36 serves to support the turntable 20 in its different positions of vertical adjustment.

Driving mechanism

A periodically operable driving mechanism is provided for actuating the various means for discharging records from the turntable 20 and for repositioning the stylus 24 to play successive records or the same record in sequence. This mechanism may be driven from any suitable source of power and preferably from the spindle 26. To this end, a gear 51 (see Figs. 4 and 5) on the spindle 26 meshes with a gear 52 fast on a shaft 53 journaled in the frame 27.

Rotatably mounted on the shaft 53 is a pinion 54 which carries a coaxial circular disk 55 on its upper surface. A clutch element 56 in the form of a disk is fast on the shaft 53, and is rotatable against the upper surface of the disk 55. The disk 56 is formed in its periphery with two diametrically opposite notches 57. Pivotally mounted at one end on the upper surface of the disk 55 adjacent its periphery is an inwardly curved clutch element 58 formed in the form of an arm having a lug 59 adapted to engage one or the other of the notches 57 to connect the shaft 53 operatively to the pinion 54. A coiled spring 60 normally tends to urge the lug 59 against the periphery of the disk 56 to effect this connection. A bracket 61 on the frame 27 embraces the upper end of the shaft 53 to anchor the latter and the clutch assembly mounted thereon.

The pinion 54 meshes with a reduction gear 62 (see Fig. 4) rotatable on a stub shaft 63. A pinion 64 rigid with the gear 62 meshes with a gear 65 on a shaft 66 journaled in the frame 27. Secured to the gear 65 for rotation therewith is a circular cam plate 67 (see Figs. 6 and 7) which constitutes the primary driving element for the various actuating means making up the operating mechanism of the phonograph.

Suitable trip means is provided for normally holding the clutch elements 56 and 58 out of engagement, and operable manually at will or automatically under the influence of the tone arm 22 to release the clutch elements into engagement for a predetermined period, for example to drive the plate 67 through one complete revolution. This means preferably comprises a lever 68 pivotally mounted intermediate its ends on a fixed post 69 on the frame 27.

One end of the lever 68 is formed with a tooth 70 movable into and out of the path of the free end of the clutch arm 58. A coiled spring 71 tends to urge the lever 68 inwardly to move the tooth 70 into position for engagement by the arm 58 to throw out the clutch. The other end of the lever 68 carries a roller 72 bearing on the periphery of the cam plate 67, and adapted to engage in a notch or depression 73 in said periphery when the plate is in its idle or inoperative position. It will be evident that when the notch 73 is moved into engagement with the roller 72, the lever 68 will be moved into position to throw out the clutch, and that upon closing the clutch to institute rotation of the plate 67, the periphery of the latter will act to hold the lever 68 in inoperative position for one full revolution of the plate.

Assuming the clutch to be open, the manual means (see Figs. 4, 13 and 14) for disengaging the arm 58 and the tooth 70 to institute the rotation of the cam plate 67 comprises a link 74 connected at one end to the toothed end of the lever 68 and at the other end to one arm of a bell-crank lever 75. The other arm of the lever 75 is connected to a rejector button 76 mounted in a control panel 77 alongside the turntable 20 over a cover board 78 covering the top of the operating mechanism. A light spring 79 acting on the lever 75 tends to maintain the button 76 in position for actuation.

A non-set means which is rendered operable when the tone arm 22 ceases to swing inwardly, as for example when the stylus 24 has reached the inner end of the sound groove, is provided for automatically tripping the lever 68 to close the clutch. This means (see Figs. 4, 5 and 6) comprises an eccentric cam 80 fixed on the shaft 53 and embraced by a strap 81. A reciprocable rod 82 secured at one end to the strap 81 is pivotally connected at its other end to a floating lever 83 intermediate the ends of the latter. The lever 83 is fulcrumed at one end on a lever 84 intermediate the ends of the latter. The lever 84 in turn is pivotally mounted at one end on a plate 85 on the frame 27, and is connected at its other end to a link 86 having a pin and slot lost motion connection 87 with the lever 68. A spring 88 anchored on the plate 85 tends to hold the lever 84 in forward position.

Pivotally mounted on the free end of the floating lever 83 is a pawl 89. A spring 90 on the lever 83 normally holds the pawl 89 against a stop pin 91 in which position it is adapted upon each oscillation of the lever 83 on the lever 84 through reciprocation of the rod 82 to engage and index a ratchet 92 rotatable on a post 93 on the frame 27. Rigid with the ratchet 92 is a second ratchet 94 having an eccentric cam face 95 and a single tooth 96. An arm 97 is pivotally mounted at one end on a pin 98 fixed on the frame 27 and anchored at its upper end by a bracket 99, and is bifurcated at its other end to provide a pawl 100 adapted for engagement by the tooth 96 and a cam finger 101 riding on the face 95 adapted to move the pawl into the path of the tooth once for each rotation of the ratchet 94.

A friction disk 102 rotatably mounted on the pin 98 is in frictional engagement with the underside of the arm 97. Rigid with the disk 102 is a coaxial pinion 103 which meshes with a segmental rack 104 on the free end of an arm 105 secured to the tone arm 22 for swinging movement therewith.

It will be evident that with each revolution of the ratchet 94, the pawl 100 will be cammed into position for engagement by the tooth 96. However, as long as the tone arm 22 continues to move inwardly during the playing of a record, the friction disk 102 will be slowly rotated, and hence will through frictional engagement return the pawl 100 to inoperative position before engagement by the tooth 96. Hence, the pawl 89 will meet no resistance, and the floating lever 83 will oscillate about its fulcrum without moving the lever 84. When, however, the stylus 24 has reached the final groove of the record and further rotation of the record fails to continue the inward movement of the tone arm 22, the disk 102 will remain stationary, and the pawl 100 will remain in position for engagement by the tooth 96 to stop further rotation of the ratchet 94. Upon the next reciprocation of the rod 82, the pawl 89 will encounter an immovable tooth of the ratchet 92, and its pivot will thereupon become the fulcrum of the floating lever 83. The latter will then actuate the lever 84 to draw the link 86 rearwardly, and therethrough effect disengagement of the clutch arm 58 and the lever 68.

*Record discharging mechanism*

A horizontally swinging arm 108 is provided for discharging records from the turntable 20. Of the arm 108, one end is rigidly secured to the upper end of a vertical rod 109, and the other end is provided with a spring-pressed pin 110 adapted to be swung into vertical alinement with the centering pin 21, then lowered to depress the latter and itself engage in the central aperture of the uppermost record, and finally in a reverse swinging movement to slide the record off the stack.

The rod 109 is slidably and rotatably mounted in a hollow vertical shaft 111 (see Figs. 9 to 12) in turn mounted for vertical and rotary movement in a tubular upright post 112 on the frame 27. A depending key or lug 113 on the hub of the arm 108 is adapted to engage in a notch 114 in the upper end of the shaft 111 to connect the arm and the shaft for joint rotary movement. A coiled compression spring 115 on the lower end of the rod 109 tends to urge the latter downwardly to establish and maintain this connection when the lug 113 and the notch 114 are in registration.

A lateral arm 116 on the shaft 111 extends movably through the lower portion of a bayonet slot 117 in the upper end of the post 112, and carries a depending bearing pin 118 on its free end. The pin 118 extends through a fork bearing 119 (see Figs. 4 and 6) on one end of a lever 120, the other end of which has a horizontal fulcrum in a head 121 mounted to swivel about a vertical axis in the frame 27.

A cam roller 122 mounted on the underside of the lever 120 is operatively disposed in a continuous cam groove 123 formed in the upper surface of the cam plate 67. Another cam roller 124 is mounted on one side of the lever 120, and rides on the plate 67 along the inner margin of the groove 123. The groove 123 is formed with an eccentric contour 125 which is movable into engagement with the roller 122 shortly after institution of the cyclic rotation of the plate 67 in a counter-clockwise direction, and is effective therethrough through the lever 120 and the shaft 111 to swing the arm 108 inwardly over the turntable 20, to pause the arm a short time with the pin 110 in alinement with the centering pin 21, and then to swing the arm outwardly into initial inoperative position. The slot 117 serves to define the inner position of the arm 108 and in general to limit the extent of angular movement thereof.

Mounted on the plate 67 along the inner edge of the eccentric contour 125 and partially in advance thereof is a short raised cam 126 for engaging the roller 124 to raise the arm 108 shortly before it is swung inwardly, and to lower the arm when over the center of the stack of records to bring the pin 110 into engagement with the central aperture of the uppermost record before the arm is swung outwardly.

The record discharged from the stack is directed over suitable spaced guides 127 on the board 78 into a receptacle 128 (see Figs. 1 and 3) built into the cabinet 29 of the phonograph at one side of the turntable 20.

Provision is made for adjusting the cam 42 through a predetermined increment each time a record is discharged to elevate the turntable 20 through a distance equal to the thickness of the record so that the records will be presented to the stylus 24 successively at the same height. To this end, a link 129 is connected at one end eccentrically to the drive cam plate 67 which thus constitutes a crank substantially at one end of its throw when in idle or inoperative position. The other end of the link 129 is pivotally connected to the long arm of a lever 130 pivotally mounted intermediate its ends on a post 131 on the frame 27. Two diverging pawl arms 132 and 133 are pivotally connected on a common axis to the free end of the short arm of the lever 130, and are connected by a coiled tension spring 134 urging them into operative engagement with opposite sides of a ratchet 135 rigid with the cam 42.

The pawl arms 132 and 133 are provided respectively on their free ends with a tooth 136 and a reverse hook 137, and hence act alternately upon oscillation of the lever 130 in opposite directions to rotate the cam 42 slowly in a counter-clockwise direction. The degree of movement of the cam 42 in each incremental step and the shape of the cam face 41 are correlated to the number of records that may be placed on the turntable 20 at one time so that as each record, excepting the bottom record, is removed, the turntable is elevated a distance equal to the thickness of one record, and after the last record has been played, the roller 40 will ride down the drop 44 to return the turntable 20 to its initial position.

Means is provided for automatically stopping the motor 30 when the last record has been played. This means (see Figs. 4, 13 and 14) preferably comprises a lug 138 on the periphery of the cam disk 45 adapted upon return of the turntable 20 into its lowermost position to engage and oscillate one end of a lever 139 pivoted on the frame 27 and normally urged by a spring 140 against a stop 141. The other end of the lever 139 is connected through a link 142 to a suitable switch 143 controlling the operation of the motor and adapted to be opened upon movement of the lever by the lug 138. The switch 143 is mounted on the frame 27, and has a hand actuator 144 extending to the panel 77.

Repeat mechanism

When it is desired to play a given record repeatedly, the discharge arm 108 and the pawl arms 132 and 133 are rendered inoperative. In the present instance, this is accomplished by raising the arm 108 to disengage the lug 113 and the notch 114 so as to break the drive connection with the shaft 111, and by spreading the pawl arms 132 and 133 out of engagement with the ratchet 135.

The specific means employed (see Figs. 4, 5, 8, 9, 10 and 12) comprises a cylindrical cam member 145 rotatably mounted on the post 112, and resting on a pair of pins 146 extending transversely from opposite sides of the shaft 111 through diametrically opposite longitudinal slots 147 and 148 in the lower end of the post. The upper end of the member 145 constitutes a cam face which engages a follower pin 149 extending laterally from the rod 109 through a slot 150 in the shaft 111 and through the slot 147, and which has a lower portion 151 defining the operative position and a raised portion 152 with two spaced depressions 153 and 154 defining the inoperative position of the arm 108. A peripheral lug 155 on the cam member 145 is pivotally connected through a link 156 to a segmental plate 157 pivotally mounted on the frame 27. The plate 157 is formed with an arm 158 of which the free end is pivotally connected through a link 159 to an intermediate portion of a lever 160 fulcrumed at one end on the frame 27. Secured to the free end of the lever 160 is an upstanding adjusting key 161 which extends through an arcuate slot 162 in the panel 77.

It will be evident that upon adjusting the key 161 along the slot 162 to move the elevated portion 151 of the cam member 145 into engagement with the pin 149, the arm 108 will be raised into inoperative position, and that upon adjusting the key to move the elevated portion out of engagement with the pin, the arm will be lowered to establish a drive connection with the hollow shaft 111.

The means for rendering the pawl arms 132 and 133 ineffective comprises a plate 163 pivotally mounted on the frame 27, and having two spaced upstanding pins 164 and 165. The plate 163 is pivotally connected through a link 166 to an intermediate portion of the arm 158 on the plate 157 so that upon adjustment of the key 161 along the slot 162 to render the discharge arm 108 inoperative, the pins 164 and 165 will be moved respectively against the pawl arms 132 and 133 to separate the latter from the ratchet 135.

It will be understood that upon adjusting the phonograph to play a given record repeatedly, the clutch 56, 58 will be operated automatically to periodically return the stylus 24 to initial playing position, and that the shaft 111 will be oscillated and the pawl arms 132 and 133 will be reciprocated, but will be ineffective to swing the discharge arm 108 and to rotate the ratchet 135.

Non-automatic operation

For non-automatic operation, means is provided for rendering the clutch 56, 58 inoperative. In the present instance, this means (see Figs. 4 and 9) comprises a spring 167 mounted on the cam member 145 and adapted to be moved thereby, upon adjustment of the key 161 along the slot 162 into "non-automatic" position intermediate the "automatic" position and the "repeat" position, into engagement with the arm 97 to hold the pawl 100 out of the path of the tooth 96 on the ratchet 94 without regard to the movement of the tone arm 22. In this adjustment, it is immaterial whether or not the discharge arm 108 and the pawl arm 132 and 133 are rendered inoperable as in the setting for "repeat".

Mechanism for operating tone arm

The tone arm 22 comprises an upright portion 168 loosely mounted for a rocking motion in a vertical plane on a hollow shaft 169 which constitutes an extension of the tone arm, and which is rotatably mounted in a bearing socket 170 in the frame 27. Screws 171 (one not shown) prevent rotational movement between the parts 168 and 169 and provide a rocking pivot therebetween.

Fixed to the part 168 is a horizontal arm 173 having at its free end a downwardly turned curved plate 174 which is adapted to engage with a supporting lever 175 pivoted on the frame 27. A cam roller 176 on one end of the lever 175 engages the underside of the cam plate 67, and is adapted to ride onto an arcuate cam 177 extending through approximately 180° shortly after rotation of the cam plate is instituted to rock the tone arm 22 upwardly and thereby remove the stylus 24 from the record.

On the upper side of the arm 173 is a lug 178 provided with a rounded shoulder 179 adapted to be yieldingly engaged by a dog 180 which is pivotally mounted on the end of the lever 130, and which is urged into operative relation with the lug by a coiled spring 181.

The plate 157 is formed with four inclined supporting ways 182, 183, 184, and 185 of which the two intermediate ways are shorter than the outer ways, and which are adapted to be engaged selectively by the curved plate 174 upon swinging the tone arm 22 outwardly.

It will be evident that upon closing the clutch 56, 58, either automatically when a record has been played or at will through actuation of the button 76, the cam 177 will oscillate the lever 175 to rock the tone arm 22 upwardly and thereby lift the stylus 24 free of the record. Thereupon the cam plate 67 acting through the link 129 will actuate the lever 130 which through engagement with the lug 178 will swing the tone arm 22 outwardly. At the extremity of this movement, the lever 175 will be released to allow the curved plate 174 to rest on the plate 157. On continued rotation of the cam plate 67, the movement of the lever 130 will be reversed, and the dog 180 will engage the shoulder 179 to swing the tone arm 22 inwardly.

Thus the plate 174 is moved off one of the ways 182 to 185 at the proper point to lower the tone arm 22 and thereby bring the stylus 24 into engagement with the next record in the initial playing position. When the stylus 24 contacts with the beginning of the sound groove, the slight resistance thus offered to further inward movement of the tone arm 22 causes disengagement of the dog 180 from the shoulder 179. Thereafter, the tone arm 22 is controlled in its inward movement by engagement of the stylus 24 with the sound groove, and the lever 130 continues to move inwardly to idle position at a rate more rapid than the inward movement of the tone arm.

The plurality of inclined ways 182, 183, 184 and 185 are provided to adapt the phonograph for playing differently sized records, and accomplish this by holding the tone arm 22 in an elevated position for a longer or shorter period after the beginning of the inward movement to correspond with the difference in diameter of the records. Thus, the way 182 is relatively long and will release the stylus 24 when the latter is in the proper position to start playing a ten inch record. Likewise, the way 183 is relatively short and will release the stylus 24 at the proper point into engagement with a twelve inch record. The two ways 182 and 183 are selectively adjustable into operative position through adjustment of the key 161 before the spring 167 is moved into engagement with the clutch control arm 97 and before the cam member 145 is effective to render the discharge arm 108 inoperative, and hence are utilized in the automatic operation. The corresponding positions of adjustment of the key 161 are indicated on the panel 77 as the "ten inch automatic" setting and the "twelve inch automatic" setting.

In adjusting the plate 157 to render the discharge arm 108 inoperative as for repeat playing, the ways 182 and 183 are moved out of the range of the curved plate 175. Hence, the ways 184 and 185 constitute a duplicate set of ways corresponding respectively to the ways 182 and 183, but utilized in the repeat playing. The corresponding positions of adjustment of the key 161 are indicated on the panel 77 as the "twelve inch repeat" setting and the "ten inch repeat" setting. The position intermediate these two sets of position is the "non-automatic" position in which the spring 167 renders the clutch operating mechanism inoperable.

The roller 49 must be adjusted in accordance with the plate 157 for automatic playing. The means for this purpose comprises a pin 186 on the underside of the plate 163 which engages one arm of a bell-crank lever 187 pivoted on the frame 27. The other arm of the lever 187 operatively embraces the roller 49. When the way 182 is adjusted into the path of the plate 174 for ten inch records, the roller 49 engages the cam 46, and when the way 183 is adjusted into operative position for twelve inch records the roller engages the underside of the cam disk 45.

Résumé of operation

A full stack of records are positioned on the turntable 20. The key 161 then is adjusted to move the way 182 or the way 183 into the path of the plate 174 depending on whether the records are ten inch or twelve inch. In adjusting the key 161, the cam member 145 is adjusted but not sufficiently to render the automatic clutch or the discharge arm 108 inoperative, and the roller 49 is adjusted either onto the cam 46 or against the plate 45.

Upon closing the switch 143 and positioning the tone arm 22, the automatic operation is instituted. When the uppermost record has been played, the tone arm 22 ceases to move inwardly, and consequently the clutch 56, 58 is closed to drive the cam plate 67 through one complete revolution. The clutch may also be closed at will before playing a given record by actuating the reject button 76.

In the rotation of the cam plate 67, the cams 126 and 177 act respectively to raise the discharge arm 108 and the tone arm 22. Subsequently, the cam contour 125 and the lever 130 serve respectively to swing the arm 108 over the center of the record stack and swing the tone arm 22 outwardly beyond initial position and over the plate 157.

The cam 126 then moves out of engagement with the roller 124 to lower the discharge arm 108 into engagement with the uppermost record, and the cam contour 125 reverses the swinging movement of the arm 108 to discharge the record into the receptacle 128. Shortly thereafter, the cam 177 releases the plate 174 into engagement with one of the ways 182 and 183. In the return movement of the lever 130, the selected way guides the plate 174 to release the stylus 24 into engagement with the next record at the beginning of the sound groove. The dog 180 now is moved out of engagement with the lug 178 to release the tone arm 22 for free swinging movement, and the lever 130 is returned to idle position. In the oscillation of the lever 130, the ratchet 135 is indexed to elevate the turntable 22 the thickness of one record.

The foregoing operation is repeated for each record until the last record has been played when the lug 138 opens the switch 143 to stop the operation of the phonograph.

If it is desired to repeat the playing of a given record, the key 161 is adjusted to position one or the other of the ways 184 and 185 in the path of the plate 174. In this adjustment, the cam member 145 renders the discharge arm 108 inoperative, and separates the arms 132 and 133 out of engagement with the ratchet 135. The clutch 56, 58, however, operates as before to effect a return of the tone arm 22 to initial position after each playing of the record.

For non-automatic operation, the key 161 is adjusted to move the spring 167 against the arm 97, thereby rendering the clutch 56, 58 inoperative.

I claim as my invention:—

1. In a phonograph, in combination, a spindle, a turntable keyed for axial adjustment on said spindle, cam means for supporting and adjusting said turntable, a ratchet for driving said cam means, an oscillatory actuating member, two pawls pivotally mounted on said member for engagement with opposite sides of said ratchet and adapted respectively upon movement in opposite directions to rotate said ratchet in one direction, and spring means urging said pawls toward said ratchet.

2. In a phonograph, in combination, a spindle, a turntable keyed for axial adjustment on said spindle, cam means for supporting and adjusting said turntable, a ratchet for driving said cam means, an oscillatory actuating member, a pawl pivotally mounted on said member, spring means tending to urge said pawl against said ratchet, and means for holding said pawl out of engagement with said ratchet.

3. In a phonograph, in combination, a spindle, a turntable keyed for axial adjustment on said spindle, cam means for supporting and adjusting said turntable, a ratchet for driving said cam means, an oscillatory actuating member, two pawls pivotally mounted on said member for engagement with opposite sides of said ratchet and adapted respectively upon movement in opposite directions to rotate said ratchet in one direction, spring means for urging said pawls against said ratchet, a plate having two upstanding pins movable against said pawls to separate the latter from said ratchet, and means for adjusting said plate.

4. In a phonograph, in combination, a spindle, a turntable keyed for axial adjustment on said spindle, means including a movable cam for supporting and adjusting said turntable on said spindle, a drive for said spindle, means for rendering said drive operative, and means movable with said cam for actuating said last mentioned means to render said drive inoperative.

5. In a phonograph, in combination, a spindle, a turntable keyed for axial adjustment on said spindle and adapted to support a stack of records, means for supporting said turntable, said means being operable to periodically adjust said turntable on said spindle, and means available at will for modifying the action of said first mentioned means to adapt same for records of different thicknesses.

6. In a phonograph, in combination, a spindle, a turntable keyed for axial adjustment on said spindle and adapted to support a stack of records, means for adjustably supporting said turntable, said means including a cam having a face for controlling the position and degree of adjustment of said turntable for records of a given thickness, and a supplemental cam available at will for adjusting said first mentioned cam to modify the action of said face to adapt same for records of a different thickness.

7. In a phonograph, in combination, a vertical spindle, a turntable keyed to said spindle and vertically adjustable thereon, a spring-pressed centering pin mounted in the upper end of said spindle and extending above said turntable, a lever supporting said turntable for vertical adjustment, said lever having a cam roller, a rotary cam engaging said roller, means for discharging the records one by one from said turntable, and a pawl and ratchet mechanism operable in timed relation to said last mentioned means for adjusting said cam to elevate said turntable the equivalent of a record each time a record is discharged and for returning said turntable to its lowermost position when the last record is discharged.

8. In a phonograph, in combination, a turntable adapted to support a record, a swinging discharge arm having an idle position at one side of said turntable, a mounting permitting rotary movement of said arm about a vertical axis and bodily movement of said arm along said axis and means for swinging said arm freely about said vertical axis from said position over said turntable, then lowering said arm bodily into engagement with the record, and then returning said arm while in engagement with the record to said position to discharge the record from said turntable.

9. In a phonograph, in combination, a turntable for supporting a record, a fixed vertical post, a shaft rotatable and slidable in said post, a rod connected to said shaft for movement therewith, a discharge arm secured to said rod for swinging movement over said turntable, and cam actuated means for elevating and lowering said shaft and for oscillating said shaft while elevated to swing said arm over said turntable and when lowered to swing said arm beyond said turntable.

10. In a phonograph, in combination, a turntable for supporting a record, a post having a slot in one side, a vertical member rotatable and longitudinally slidable in said post, a discharge arm connected to said member for swinging movement over said turntable, a lateral arm on said member, a lever having a universal fulcrum engaging said lateral arm, and a rotary member having a cam for actuating said lever to raise and lower said first mentioned member and having a cam for actuating said lever to oscillate said first mentioned member.

11. In a phonograph, in combination, a turntable, a vertical drive shaft, a rod extending through said shaft, a record discharging arm secured to said rod and resting on said shaft, separable end clutch elements for connecting said arm to said shaft, spring means tending to maintain said elements in coacting engagement, and means for elevating said arm relative to said shaft to separate said elements.

12. In a phonograph, in combination, a turntable, a tone arm movable over said turntable, a power drive including a main clutch, a non-set mechanism automatically operable normally to hold said clutch open and when said tone arm ceases to move inwardly over said turntable to close said clutch for a predetermined period, a record discharging member, means operable from said clutch and having a separable connection with said member for actuating the latter, and cam means movable into one position to break said connection and into another position to render said non-set mechanism inoperable to effect closing of said clutch.

13. In a phonograph, in combination, a turntable for a record, a tone arm mounted for swinging movement over said turntable, a constantly rotating member, a clutch element rotatable with said member, a driven member, a second clutch element movable with said driven member, spring means tending to urge said elements into engagement, a detent, spring means tending to urge said detent into position to disengage said elements, a normally stationary lever connected to said detent, a floating lever fulcrumed on said stationary lever, a pawl on the free end of said floating lever, means operable from said rotating member for continuously oscillating said floating lever, a ratchet coacting with said pawl, a second ratchet rigid with said first mentioned ratchet, a pivotal arm movable into and out of position for engagement by said second ratchet, the latter having means for camming said pivotal arm into said position, and friction means driven by said tone arm and operable upon movement of said tone arm inwardly over the record to move said pivotal arm out of said position before engagement by said second ratchet, and means operable from said driven member upon engagement of said clutch elements for disengaging said clutch elements after a predetermined movement.

14. In a phonograph, in combination, a tone arm mounted for swinging movement, a clutch normally tending to close, a normally stationary detent for holding said clutch open, a continuously oscillating member connected to said detent, an abutment for said member normally yieldable upon engagement by said member, a stop, means movable with said abutment for periodically moving said stop into the path of said abutment, and means operable by said tone arm upon movement of the latter in one direction to move said stop out of said path before engagement by said abutment.

15. In a phonograph, in combination, a tone arm mounted for swinging movement, a clutch normally tending to close, a normally stationary detent for holding said clutch open, a continuously oscillating member connected to said detent, an abutment for said member normally yieldable upon engagement by said member, a stop, means movable with said abutment for periodically moving said stop into the path of said abutment, means operable by said tone arm upon movement of the latter in one direction to move said stop out of said path before engagement by said abutment, and means operable at will for holding said stop out of said path to render said first mentioned means ineffective.

16. In a phonograph, in combination, a vertical drive spindle, electric means for driving said spindle, a switch for controlling said electric means, a turntable for a stack of records keyed to said spindle for vertical adjustment, a rotary cam, means coacting with said cam for supporting said turntable, means for periodically discharging a record from the stack, means operable in timed relation to said last mentioned means for adjusting said cam to elevate said turntable the equivalent of a record each time an upper record is discharged and for returning said turntable into its lowermost position when the last record of the stack is discharged, and means on said cam for opening said switch when the last record is discharged.

17. In a phonograph, in combination, a rotary support for a record to be played, a tone arm mounted for vertical movement and to swing in a horizontal plane, an adjustable supporting member having a plurality of inclined guides of different lengths, and means for automatically raising and lowering said tone arm and for swinging said tone arm while raised onto one of said guides and for removing said tone arm from one of said guides to permit the playing of the record.

18. In a phonograph, in combination, a rotary support for a record to be played, a tone arm mounted for vertical movement and for horizontal swinging movement, a plate having a plurality of guides adapted for selective adjustment into position to support said tone arm in elevated position, said guides being of different lengths to accommodate differently sized records, means for elevating said tone arm, means for swinging said tone arm while elevated onto one of said guides and for moving said tone arm when released by said first mentioned means off of said one guide, said one guide determining the point at which said tone arm is brought into engagement with the record, said last mentioned means being adapted to release said tone arm upon engagement of the latter with said record.

MARTIN NYSTROM.